US008732352B1

(12) United States Patent
Herbeck

(10) Patent No.: US 8,732,352 B1
(45) Date of Patent: May 20, 2014

(54) DYNAMIC ALLOCATION OF BUFFERS FOR DIRECT MEMORY ACCESS

(71) Applicant: Apple Inc., Cupertino, CA (US)

(72) Inventor: Gilbert Herbeck, Livermore, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/750,266

(22) Filed: Jan. 25, 2013

(51) Int. Cl.
*G06F 13/14* (2006.01)

(52) U.S. Cl.
USPC ............................................... 710/22; 710/33

(58) Field of Classification Search
None
See application file for complete search history.

(56) References Cited

U.S. PATENT DOCUMENTS

| | | | |
|---|---|---|---|
| 5,671,445 A * | 9/1997 | Gluyas et al. .................... 710/53 |
| 6,275,877 B1 | 8/2001 | Duda | |
| 6,279,052 B1 | 8/2001 | Upadrastra | |
| 7,373,437 B2 * | 5/2008 | Seigneret et al. ................ 710/22 |
| 7,496,695 B2 | 2/2009 | Go et al. | |
| 7,548,586 B1 * | 6/2009 | Mimar ....................... 375/240.26 |
| 7,689,732 B2 * | 3/2010 | Chen et al. ....................... 710/22 |
| 7,779,164 B2 * | 8/2010 | Hendel et al. .................. 709/250 |
| 8,122,177 B1 * | 2/2012 | Puranik .......................... 710/308 |
| 8,578,068 B2 * | 11/2013 | Blocksome et al. ............ 710/22 |
| 2006/0041895 A1 * | 2/2006 | Berreth ......................... 719/328 |
| 2009/0210577 A1 * | 8/2009 | Lu .................................. 710/22 |
| 2011/0032995 A1 | 2/2011 | Chua et al. | |
| 2013/0282933 A1 * | 10/2013 | Jokinen et al. .................. 710/22 |

* cited by examiner

*Primary Examiner* — Cheng-Yuan Tseng
(74) *Attorney, Agent, or Firm* — Meyertons, Hood, Kivlin, Kowert & Goetzel, P.C.

(57) ABSTRACT

A device includes a processor, unified DMA ('Direct Memory Access') storage, and a number of DMA engines. The processor may be operatively coupled to the unified DMA storage and a main memory. The DMA engines may be configured to access the unified DMA storage and provide DMA transmissions between the main memory and a corresponding component. The processor may be configured to: determine a size of a corresponding DMA buffer to be allocated for each DMA engine; allocate, for each DMA engine, the corresponding DMA buffer of the determined size in the unified DMA storage; and execute DMA transmission using the DMA engines and the corresponding DMA buffers.

25 Claims, 5 Drawing Sheets

DYNAMIC ALLOCATION OF BUFFERS FOR DIRECT MEMORY ACCESS

BACKGROUND

1. Technical Field

This disclosure relates generally to direct memory access (DMA), and more particularly to apparatus, devices, methods, and processors for dynamically administering DMA buffers.

2. Description of the Related Art

In recent years, mobile devices such as smart phones and tablet computers have become increasingly sophisticated. In addition to supporting telephone calls, many mobile devices now provide access to the internet, email, text messaging, and navigation using the global positioning system (GPS). Mobile devices that support such sophisticated functionality often include many components. In such mobile devices, a processor of the mobile device may be configured with a number of DMA engines, each which may be configured to couple the main memory to a component of the mobile device for out-of-band DMA transmission between the main memory and component. In mobile devices and other systems of the prior art, each such DMA engine is typically identical to the others and includes some local memory storage that supports DMA transmissions. Further such local storage is generally implemented with area and power consuming DQ flip-flops or the like. In many systems, however, each DMA engine is not utilized equally. As such, the local memory storage of many DMA engines is often underutilized causing an inefficient utilization of memory and power consumption.

SUMMARY

Various example devices, processors, computer readable storage media, and methods are disclosed. Such example devices may include a processor, computer memory, and a number of DMA engines. In such devices, the processor may be operatively coupled to unified DMA storage and the main memory. Also in such devices, each DMA engine may be configured to provide DMA transmissions between the main memory and a corresponding component. The processor of such an example device may be configured to: determine a size of a corresponding DMA buffer to be allocated for each DMA engine; allocate, for each DMA engine, the corresponding DMA buffer of the determined size in the unified DMA storage; and execute DMA transmissions using the DMA engines and the corresponding DMA buffers.

Also disclosed are example processors configured to dynamically administer DMA buffers for a plurality of DMA engines. Such DMA engines may be configured to provide DMA transmissions between a main memory and a corresponding component. Such example processors may be configured to determine a size of a corresponding DMA buffer to be allocated for each DMA engine; allocate, for each DMA engine, the corresponding DMA buffer of the determined size in unified DMA storage accessible by the DMA engines; and execute DMA transmission using the DMA engines and the corresponding DMA buffers.

Example computer readable storage media are also disclosed. Such example media may include computer program instructions that dynamically administer DMA buffers for a number of DMA engines, where each DMA engine may be configured to provide DMA transmissions between a main memory and a corresponding component. Such example computer program instructions may be executable by a processor to: determine a size of a corresponding DMA buffer to be allocated for each DMA engine; allocate, for each DMA engine, the corresponding DMA buffer of the determined size in unified DMA storage accessible by the DMA engines; and execute DMA transmissions using the corresponding DMA buffers and the DMA engines.

Methods of dynamically administering DMA buffers for a plurality of DMA engines, where each DMA engine may be configured to provide DMA transmissions between a main memory and a corresponding component are also disclosed. Such methods may include determining, by the processor, a size of a corresponding DMA buffer to be allocated for each DMA engine; allocating, by the processor for each DMA engine, the corresponding DMA buffer of the determined size in unified DMA storage accessible by the DMA engines; and executing DMA transmissions using the corresponding DMA buffers and the DMA engines.

Figure 1:
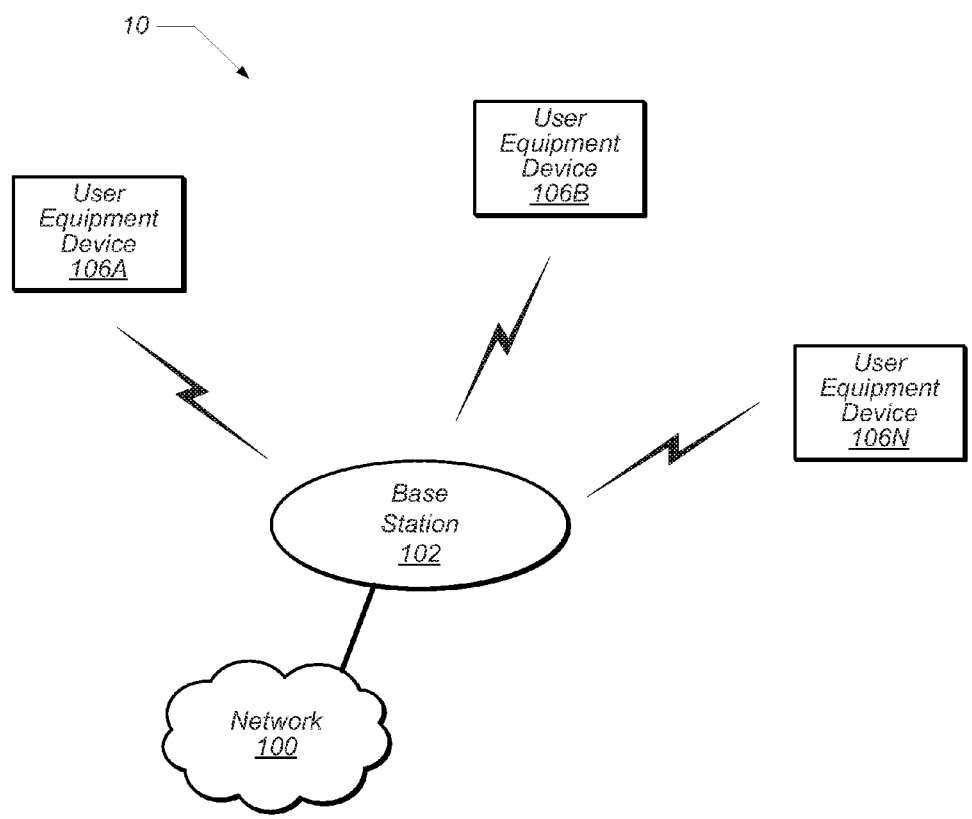
FIG. 1 sets forth a block diagram of one embodiment of a wireless communication system.

Specific embodiments are shown by way of example in the drawings and will herein be described in detail. It should be understood, however, that the drawings and detailed description are not intended to limit the claims to the particular embodiments disclosed, even where only a single embodiment is described with respect to a particular feature. On the contrary, the intention is to cover all modifications, equivalents and alternatives that would be apparent to a person skilled in the art having the benefit of this disclosure. Examples of features provided in the disclosure are intended to be illustrative rather than restrictive unless stated otherwise.

As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six, interpretation for that unit/circuit/component.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

FIG. 1 sets forth a block diagram of one embodiment of a wireless communication system. The system of FIG. 1 is one example of any of a variety of wireless communication systems. The wireless communication system 10 includes a base station 102 which communicates over a wireless transmission medium such as, for example, an over the air interface with one or more user equipment (UE) devices, 106A through 106N. The base station 102 is also coupled a network 100 via another interface, which may be wired or wireless. Components identified by reference designators that include both a number and a letter may be referred to by the only a number where appropriate.

The base station 102 may be a base transceiver station (BTS) or cell site, and may include hardware that enables wireless communication with one or more of the UEs 106. The base station 102 may also be equipped to communicate with the network 100. Thus, the base station 102 may facilitate communication between the UEs 106 and/or between the UEs 106 and the network 100. The communication area (or coverage area) of the base station 102 may be referred to as a "cell." In various embodiments, the base station 102 and the UEs may be configured to communicate over the transmission medium using any of various wireless communication radio access technologies such as LTE, eHRPD, GSM, CDMA, WLL, WAN, WiFi, WiMAX, etc. In embodiments that communicate using the eHRPD standard, the BTS 102 may be referred to as an HRPD BTS, and the network 100 may include an eAN/ePCF and a number of gateways including HRPD gateway (HSGW), a PDN gateway (P-GW), and a number of policy and packet control functions that may be associated with a service provider, for example.

In one embodiment, each of the UEs 106A-106N may be representative of a device with wireless network connectivity such as a mobile phone, a hand-held device, a computer or a tablet, or virtually any type of wireless device. As described further below, the UE 106 may include at least one processor that is configured to execute program instructions stored in a memory. Accordingly, in some embodiments, the UE 106 may perform one or more portions of the functionality described below by executing such stored instructions. However, in other embodiments, the UE 106 may include one or more hardware elements and/or one or more programmable hardware elements such as an FPGA (field-programmable gate array) that may be configured to perform the one or more portions the functionality described below. In still other embodiments, any combination of hardware and software may be implemented to perform the functionality described below.

In the system 10 of FIG. 1, any of the UEs 106 may include a processor, unified DMA storage, a main memory, and a number of DMA engines. In such an embodiment, the processor may be operatively coupled to the unified DMA storage and the main memory. The DMA engines may be configured to access the unified DMA storage and provide DMA transmissions between the main memory and a corresponding component. The processor may be configured to determine a size of a corresponding DMA buffer to be allocated for each DMA engine. The processor may also allocate, for each DMA engine, the corresponding DMA buffer of the determined size in the unified DMA storage. The processor may also be configured to execute DMA transmissions using the corresponding DMA buffers and the DMA engines.

Figure 2:
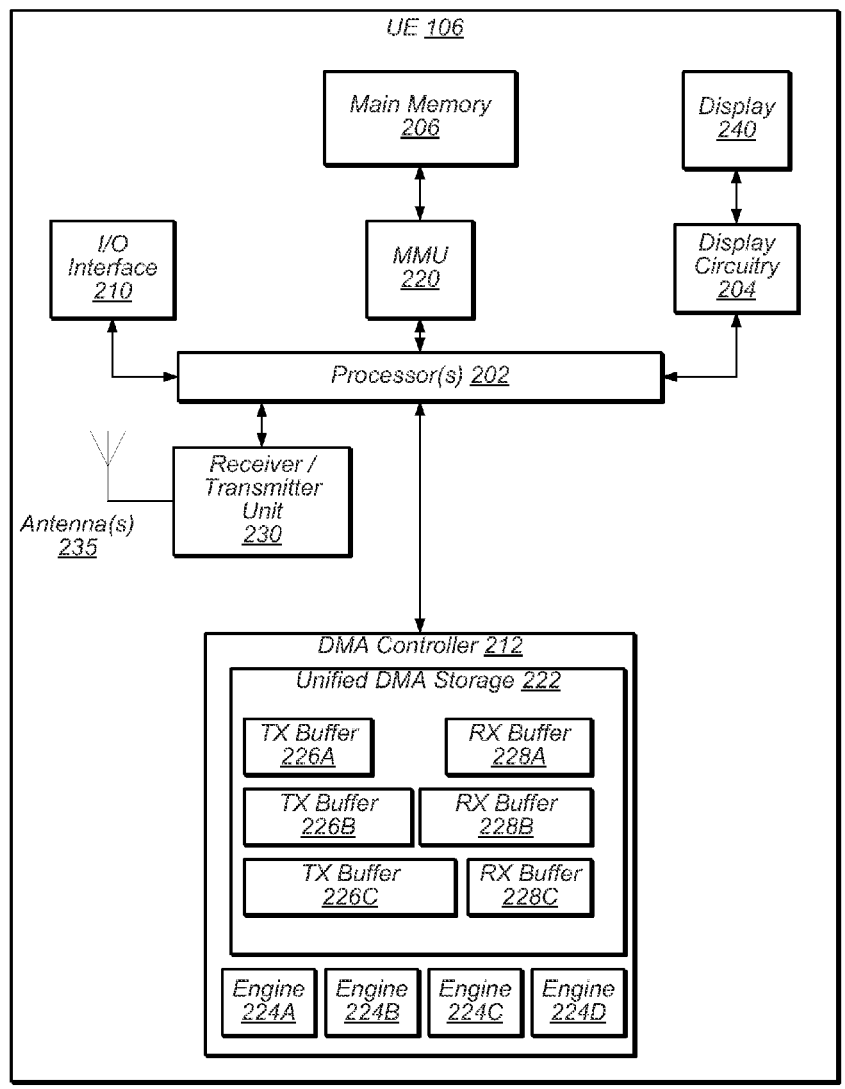
FIG. 2 sets forth a block diagram of one embodiment of a wireless communication device shown in FIG. 1.

For further explanation, FIG. 2 sets forth a block diagram of one embodiment of a wireless communication device shown in FIG. 1. The UE 106 includes one or more processors 202 (or one or more processor cores 202) which are coupled to display circuitry 204 which is in turn coupled to the display 240. The display circuitry 204 may be configured to perform graphics processing and provide display signals to the display 240.

The one or more processors 202 are also coupled to a memory management unit (MMU) 220 and to a receiver/transmitter (R/T) unit 230. The MMU 220 is coupled to a main memory 206. The UE 106 also includes an I/O interface 210 that is coupled to the processor(s) 202, and may be used for coupling the UE 106 to a computer system, or other external device. It is noted that in one embodiment the components shown within UE 106 of FIG. 2 may be manufactured as standalone components. In other embodiments, however, various ones of the components may be part of one or more chipsets or part of a system on chip (SOC) implementation.

In various embodiments, the processors 202 may be representative of a number of different types of processors that may be found in a wireless communication device. For example, the processors 202 may include general processing capability, digital signal processing capability, as well as hardware accelerator functionality, as desired. The processors 202 may include baseband processing and therefore may digitally process the signals received by the R/T unit 230. The processors 202 may also process data that may be transmitted by the R/T unit 230. The processors 202 may also perform a number of other data processing functions such as running an operating system and user applications for the UE 106.

In one embodiment, the MMU 220 may be configured to receive addresses from the one or more processors 202 and to translate those addresses to locations in memory (e.g., main memory 206) and/or to other circuits or devices, such as the display circuitry 204, R/T unit 230, and/or display 240. The MMU 220 may also return data to one or more of the processors 202 from the locations in main memory 206. The MMU 220 may be configured to perform memory protection and page table translation or set up. In some embodiments, the MMU 220 may be included as a portion of one or more of the processors 202.

The R/T unit 230 may, in one embodiment, include analog radio frequency (RF) circuitry for receiving and transmitting RF signals via the antenna 235 to perform the wireless communication. The R/T unit 230 may also include down-conversion circuitry to lower the incoming RF signals to the baseband or intermediate frequency (IF) as desired. For example, the R/T unit 230 may include various RF and IF filters, local oscillators, mixers, and the like. Since the UE 106 may operate according to a number of radio access technologies, the R/T unit 230 may include a corresponding number of RF front end portions to receive and down-convert, as well as up-convert and transmit the respective RF signals of each technology.

The example UE 106 may also include a DMA controller 212 and a number of DMA engines 224A, 224B, 224C, 224D. Each DMA engine may be coupled to a corresponding component of the UE 106, such as the I/O interface 210, display circuitry 204, and so on. In embodiments in which components of the UE 106 are implemented as a SOC, each DMA engine 224 may be coupled to a corresponding on-chip component or off-chip component. The DMA controller 212 may include modules of circuitry designed, programmed, or both, to effect DMA transmissions between the main memory 206 and other components of the UE 106. A DMA transmission from the main memory 206 to a device may be effected by the processor storing data in the main memory 206 and informing the DMA controller 212 that the data is intended for transmission to another component. The processor may 'inform' the DMA controller 212 in a variety of manners. In some embodiments, for example, the storage of the data in a predefined location in the main memory 206 may inform the DMA controller 212 that the data is to be transmitted to another component. In other embodiments, the processor 202 may be configured to provide the DMA controller with a data descriptor that provides a pointer to the memory location in main memory 206 at which the data is stored. Once the DMA controller 212 is informed of the data to be transmitted, the DMA controller 212 (or a DMA engine) may transfer the data from the main memory 206 to the unified DMA storage 222 where the data may be stored in a DMA engine's transmit buffer 226A, 226B, 226C. The DMA engine associated with the transmit buffer may then processes the transmit buffer 226 and transmit the data to the intended recipient. In some embodiments, the transmit buffers 226 are processed in a FIFO ('First-In-First-Out') manner. A DMA engine may also receive data from a component in a receive buffer 228A, 228B, 228C and transmit the data from the receive buffer 228 to main memory 206 for processing by the processor 202.

In the system of FIG. 2, the processor may be configured to determine a size of a corresponding DMA buffer (such as the transmit or receive buffers) to be allocated for each DMA engine 224. Once determined, the processor may allocate, for each DMA engine 224, the corresponding DMA buffer 226, 228 of the determined size in unified DMA storage 222 accessible by the DMA engines. In the example of FIG. 2 each transmit buffer 226 and receive buffer 228 are depicted as being of different sizes. Further, in some embodiments (such as the one depicted in FIG. 2), the processor may determine that no buffer may be allocated for at least one DMA engine 224. The example of FIG. 2 depicts transmit and receive buffers allocated for only three of the four DMA engines 224.

The processor 202 may determine the size of such buffers 226, 228 in various ways. In one embodiment, for example, the processor may be provided a buffer size for each DMA engine to be allocated on startup. In another example, the processor 202 may identify the component coupled to each DMA engine and determine a size of a buffer to allocate for each DMA engine based on the component type. In another example, the processor 202 may determine a size of a corresponding DMA buffer to allocate for each DMA engine based on an expected bandwidth utilization of the DMA engine.

In addition to allocating the DMA buffers 226, 228 at startup, the processor 202 may also be configured to monitor DMA traffic or utilization of each buffer (or DMA engine) and reallocate buffers accordingly. In an embodiment in which one DMA buffer is utilized far greater than the others, the processor 202 may reallocate the corresponding DMA buffer at a greater size. Further, for DMA buffers being underutilized, the processor 202 may reduce the size of the buffers.

By allocating buffers of different sizes based on actual or expected utilization of the DMA engine, the overall area may be reduced relative to DMA engines of the past. Further, in some embodiments the unified DMA storage 222 may be implemented with an array of physical memory cells, such as SRAM or the like, rather than DQ flip-flops or latches as is typical of local memory storage of a DMA engine. In this way, area and power consumption may be conserved relative to DMA engines that implement memory buffers in local storage of the same size.

Figure 3:
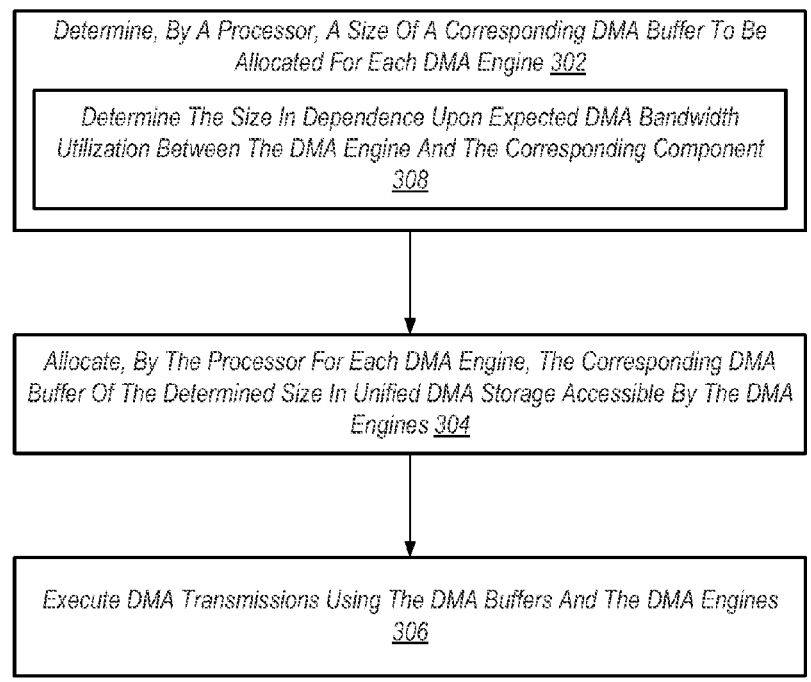
FIG. 3 sets forth a flowchart illustrating an example method of dynamically administering DMA buffers.

For further explanation, FIG. 3 sets forth a flow chart illustrating an example method of dynamically administering DMA buffers. The example method of FIG. 3 may be carried out in a device or system similar to that described above with respect to FIG. 1 and FIG. 2. Such a device or system may include a processor operatively coupled to unified DMA storage and a main memory. Such a device or system may also include a number of DMA engines configured to access the unified DMA storage and provide DMA transmission between the main memory and corresponding components.

To that end, the method of FIG. 3 includes determining 302, by a processor, a size of a corresponding DMA buffer to be allocated for each DMA engine. In the method of FIG. 3, determining 302, by a processor, a size of a corresponding DMA buffer to be allocated for each DMA engine may be carried out by determining 308 the size in dependence upon expected DMA bandwidth utilization between the DMA engine and the device coupled to the DMA engine. In some embodiments, such information may be programmed into one or more registers of the processor such that upon startup, the processor may determine the size of a corresponding DMA buffer by reading the information from the register.

The method of FIG. 3 also includes allocating 304, by the processor for each DMA engine, a DMA buffer of the determined size in the unified DMA storage. Allocating 304 the DMA buffer may be carried out in various ways including, for example, by requesting such an allocation from a memory management controller that controls allocation of the unified DMA storage.

The method of FIG. 3. also includes executing 306 DMA transmissions with the DMA buffers and the DMA engines. Executing 306 DMA transmissions may be carried out in various ways. For a DMA transmission from main memory to a device or component, the processor may store data to be transmitted in the main memory and inform a DMA controller of the data to be transmitted. The DMA controller may store the data in a transmit buffer associated with a DMA engine that is coupled to the device or component. The DMA engine may process the transmit buffer, package the data into a form recognizable by the intended recipient, and transmit the data to the intended recipient. For a DMA transmission originating at a device or component, the device or component may transmit data to the DMA engine as an entry in the corresponding DMA engine's receive buffer. The DMA engine may process the receive buffer, unpack the data, store the data in the main memory, where the processor will process the data.

Figure 4:
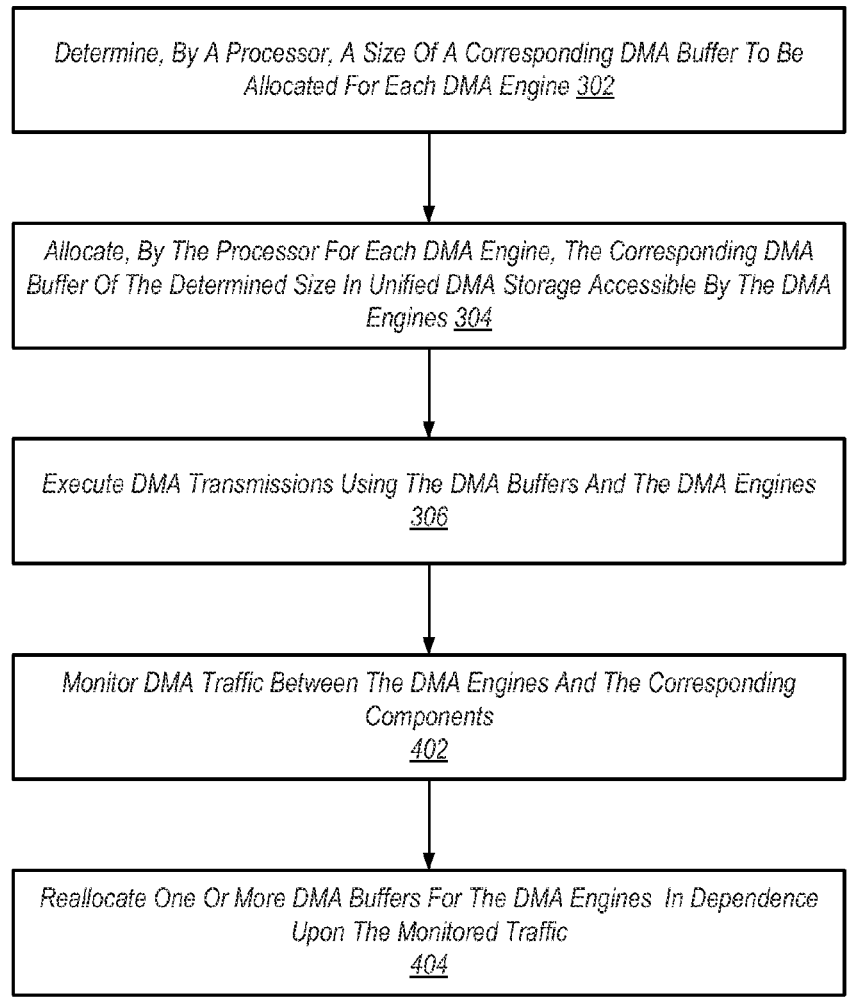
FIG. 4 sets forth a flowchart illustrating another example method of dynamically administering DMA buffers.

For further explanation, FIG. 4 sets forth a flow chart illustrating another example method of dynamically administering DMA buffers. The method of FIG. 4 is similar to the method of FIG. 3 in that the method of FIG. 4 also includes determining 302 a size of a corresponding DMA buffer, allocating 304 a DMA buffer of the determined size in unified DMA storage, and executing DMA transmissions with the DMA buffers and engines. The method of FIG. 4, however, differs from the method of FIG. 3 in that in the method of FIG. 4 also includes monitoring 402 DMA traffic between the DMA engines and devices to which the DMA engines are coupled. Such monitoring 402 may be carried out in various ways, including, keeping a count of packets of data transmitted from each transmit buffer or received by each receive buffer.

The method of FIG. 4 also includes reallocating 404 one or more DMA buffers for the DMA engines in dependence upon the monitored traffic. For highly active DMA buffers, a processor may reallocate a DMA buffer to be a DMA buffer of a greater size. For under-utilized DMA buffers, the processor may reallocate a DMA buffer to be of a lesser size. For non-utilized DMA buffers, the processor may remove the allocation of the DMA buffer entirely.

Figure 5:
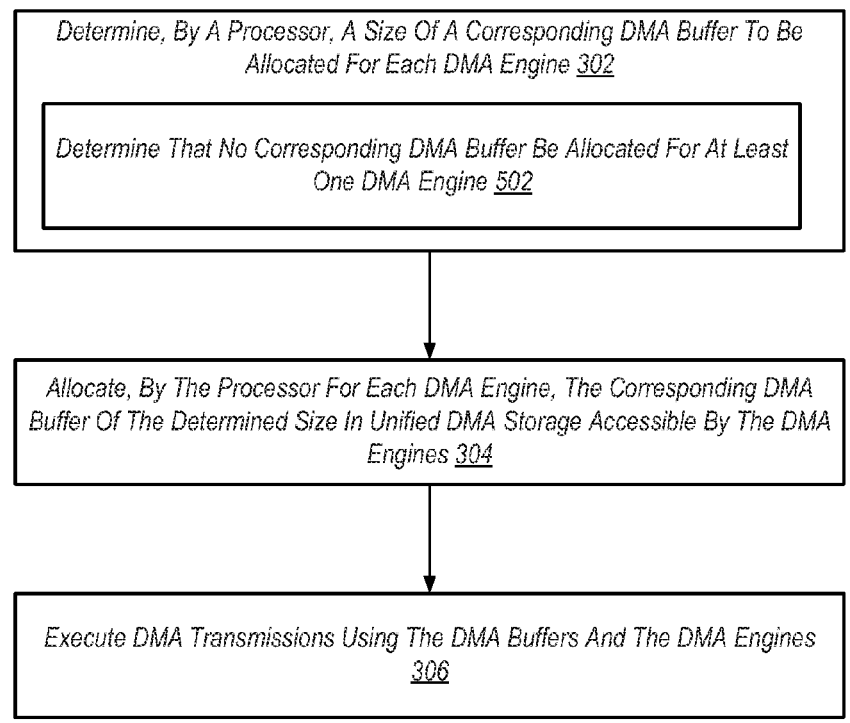
FIG. 5 sets forth a flowchart illustrating another example method of dynamically administering DMA buffers.

For further explanation, FIG. 5 sets forth a flow chart illustrating another example method of dynamically administering DMA buffers. The method of FIG. 5 is similar to the method of FIG. 3 in that the method of FIG. 5 also includes determining 302 a size of a corresponding DMA buffer, allocating 304 a DMA buffer of the determined size in the unified DMA storage, and executing DMA transmissions with the DMA buffers and engines. The method of FIG. 5 differs from the method of FIG. 3, however, in that in the method of FIG. 5, determining 302 a size of a corresponding DMA buffer to be allocated for each DMA engine includes determining 502 that no DMA buffer be allocated for at least one DMA engine. Consider an example in which a device coupled to a DMA engine is known to have relatively little DMA transmission traffic. Rather than allocate a transmit and receive buffer for the DMA engine, the processor, on start up may determine that no buffer be allocated. In such an example, the processor may dynamically allocate a DMA buffer upon discovering data to be transmitted to the device via one or more DMA transmissions. Additionally, the processor may dynamically allocate a DMA buffer upon receiving from the device, or another component responsive to the device, an interrupt signal informing the processor that the device intends to send a DMA transmission. It is noted that these are but a few methods in which a DMA engine with no DMA buffer allocated may be utilized at some time during operation, but many other such methods may exist.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A device comprising:
unified DMA ('Direct Memory Access') storage;
a processor operatively coupled to the unified DMA storage and a main memory; and
a plurality of DMA ('Direct Memory Access') engines, wherein the plurality of DMA engines are configured to access the unified DMA storage and provide DMA transmissions between the main memory and a corresponding component; and
wherein the processor is configured to:
determine a size of a corresponding DMA buffer to be allocated for each DMA engine;
allocate, for each DMA engine, the corresponding DMA buffer of the determined size in the unified DMA memory; and
execute DMA transmissions using the DMA engines and the corresponding DMA buffers.

2. The device of claim 1, wherein the processor is further configured to:
monitor DMA traffic between the DMA engines and the corresponding components; and
reallocate one or more corresponding DMA buffers for the DMA engines in dependence upon the monitored traffic.

3. The device of claim 1, wherein the processor is further configured to determine that no corresponding DMA buffer be allocated for at least one DMA engine.

4. The device of claim 1, wherein the processor is further configured to determine the size of the corresponding DMA buffer to be allocated for each DMA engine in dependence upon expected DMA bandwidth utilization between the DMA engines and the corresponding components.

5. The device of claim 1 wherein the device further comprises a wireless mobile device.

6. The device of claim 1, wherein the unified DMA storage comprises an array of physical memory cells.

7. The device of claim 1, wherein the processor is further configured to:
determine a first size for a corresponding transmit DMA buffer for each DMA engine;
determine a second size for a corresponding receive DMA buffer for each DMA engine;
allocate, for each DMA engine, the corresponding transmit DMA buffer of the first determined size in the unified DMA storage; and
allocate, for each DMA engine, the corresponding receive DMA buffer of the second determined size in the unified DMA storage.

8. A method of dynamically administering DMA ('Direct Memory Access') buffers for a plurality of DMA engines, wherein each DMA engine is configured to provide DMA transmissions between a main memory and a corresponding component, the method comprising:
determining, by the processor, a size of a corresponding DMA buffer to be allocated for each DMA engine;
allocating, by the processor for each DMA engine, the corresponding DMA buffer of the determined size in unified DMA storage accessible by the DMA engines; and
executing DMA transmissions using the DMA engines and corresponding DMA buffers.

9. The method of claim 8, further comprising:
monitoring DMA traffic between the DMA engines and corresponding components; and
reallocating one or more corresponding DMA buffers for the DMA engines in dependence upon the monitored traffic.

10. The method of claim 8, wherein determining, by a processor, a size of a corresponding DMA buffer to be allocated for each DMA engine further comprises determining that no corresponding DMA buffer be allocated for at least one DMA engine.

11. The method of claim 8, wherein determining, by a processor, a size of a corresponding DMA buffer to be allocated for each DMA engine further comprises determining the size in dependence upon expected DMA bandwidth utilization between the DMA engines and the corresponding components.

12. The method of claim 8, wherein the unified DMA storage comprises an array of physical memory cells.

13. A processor for dynamically administering DMA ('Direct Memory Access') buffers for a plurality of DMA engines, wherein each DMA engine is configured to provide DMA transmission between a main memory and a corresponding component, wherein the processor is configured to:
determine a size of a corresponding DMA buffer to be allocated for each DMA engine;
allocate, for each DMA engine, the corresponding DMA buffer of the determined size in unified DMA storage accessible by the DMA engines; and
execute DMA transmissions using the DMA engines and the corresponding DMA buffers.

14. The processor of claim 13, further configured to:
monitor DMA traffic between the DMA engines and corresponding components; and
reallocate one or more corresponding DMA buffers for the DMA engines in dependence upon the monitored traffic.

15. The processor of claim 13, wherein the processor is further configured to determine that no corresponding DMA buffer be allocated for at least one DMA engine.

16. The processor of claim 13, wherein the processor is further configured to determine the size of the corresponding DMA buffer to be allocated for each DMA engine in dependence upon expected DMA bandwidth utilization between the DMA engines and the corresponding components.

17. The processor of claim 13, wherein the processor, the main memory, the unified DMA storage, and the DMA engines comprise components of a system-on-chip.

18. The processor of claim 17, wherein one or more of the DMA engines is configured to provide DMA transmission between the main memory and a corresponding on-chip component.

19. The processor of claim 17, wherein one or more of the DMA engines is configured to provide DMA transmissions between the main memory and a corresponding off-chip component.

20. The processor of claim 13, wherein the unified DMA storage comprises an array of physical memory cells.

21. A computer readable storage medium including computer program instructions for dynamically administering DMA ('Direct Memory Access') buffers for a plurality of DMA engines, wherein each DMA engine is configured to provide DMA transmissions between a main memory and a corresponding component and the computer program instructions are executable by the processor to:

determine a size of a corresponding DMA buffer to be allocated for each DMA engine;
allocate, for each DMA engine, the corresponding DMA buffer of the determined size in unified DMA storage accessible by the DMA engines; and
execute DMA transmissions using the DMA engines and the corresponding DMA buffers.

22. The computer readable storage medium of claim 21, further comprising computer program instructions executable by the processor to:
monitor DMA traffic between the DMA engines and the corresponding components; and
reallocate one or more corresponding DMA buffers for the DMA engines in dependence upon the monitored traffic.

23. The computer readable storage medium of claim 21, wherein the computer program instructions executable by the processor to determine a size of a corresponding DMA buffer to be allocated for each DMA engine further comprise computer program instructions executable by the processor to determine that no corresponding DMA buffer be allocated for at least one DMA engine.

24. The computer readable storage medium of claim 21, wherein the computer program instructions executable by the processor to determine a size of a corresponding DMA buffer to be allocated for each DMA engine further comprise computer program instructions executable by the processor to determine the size in dependence upon expected DMA bandwidth utilization between the DMA engines and the corresponding components.

25. The computer readable storage medium of claim 21, wherein the unified DMA storage comprises an array of physical memory cells.

* * * * *